United States Patent
Araki (10) Patent No.: US 9,747,059 B2
(45) Date of Patent: *Aug. 29, 2017

(54) SYSTEM, APPARATUS, AND INFORMATION PROCESSING METHOD FOR DELIVERING EVENT INFORMATION INDICATING AN EVENT GENERATED IN AN APPARATUS TO ONE OR MORE PROCESSORS OF THE APPARATUS

(71) Applicant: RICOH COMPANY, LTD., Tokyo (JP)

(72) Inventor: Ryoji Araki, Fukuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/074,542

(22) Filed: Mar. 18, 2016

(65) Prior Publication Data

US 2016/0203033 A1    Jul. 14, 2016

Related U.S. Application Data

(63) Continuation of application No. 14/479,979, filed on Sep. 8, 2014, now Pat. No. 9,323,478.

(30) Foreign Application Priority Data

Sep. 12, 2013 (JP) ................................ 2013-189064

(51) Int. Cl.

| G06F 13/00 | (2006.01) |
|---|---|
| G06F 3/12 | (2006.01) |
| G06F 9/54 | (2006.01) |
| G06F 11/30 | (2006.01) |

(52) U.S. Cl.
CPC ............. *G06F 3/12* (2013.01); *G06F 9/542* (2013.01); *G06F 9/543* (2013.01); *G06F 11/3055* (2013.01)

(58) Field of Classification Search
CPC ......... G06F 9/4843; G06F 9/541; G06F 9/542
USPC ................................. 718/100; 719/318, 328
See application file for complete search history.

(56) References Cited

U.S. PATENT DOCUMENTS

| 8,255,908 B2 | 8/2012 | Waris |
|---|---|---|
| 8,478,883 B2 | 7/2013 | Day |
| 8,908,217 B2 | 12/2014 | Anezaki |

FOREIGN PATENT DOCUMENTS

JP    2009-223577    10/2009

*Primary Examiner* — Andy Ho
(74) *Attorney, Agent, or Firm* — Oblon, McClelland, Maier & Neustadt, L.L.P.

(57) ABSTRACT

An apparatus includes an operating unit. The operating unit includes one or more processors each configured to transmit an execution request for executing a process based on a user's operation, and a delivery unit configured to receive event information indicating an event generated in the apparatus, and to deliver the received event information to the processors. A connection is established for performing communications between the apparatus and the operating unit every time each of the processors transmits the execution request, and a permanent connection for performing communications between the apparatus and the operating unit that is permanently established is used when the delivery unit receives the event information.

16 Claims, 10 Drawing Sheets

| EVENT ID | REQUEST ID | LISTENER |
|---|---|---|
| 12345 | 001 | aaaaa |
|  |  |  |
|  |  |  |

FIG.9

| EVENT ID | REQUEST ID | LISTENER |
|---|---|---|
| 12345 | 001 | aaaaa |
| 67890 | 002 | bbbbb |
|  |  |  |

FIG.11

| EVENT ID | REQUEST ID | LISTENER |
|---|---|---|
| 12345 | 001 | aaaaa, bbbbb |
|  |  |  |
|  |  |  |

SYSTEM, APPARATUS, AND INFORMATION PROCESSING METHOD FOR DELIVERING EVENT INFORMATION INDICATING AN EVENT GENERATED IN AN APPARATUS TO ONE OR MORE PROCESSORS OF THE APPARATUS

CROSS-REFERENCE TO RELATED APPLICATIONS

The present application is a continuation of and claims the benefit of priority under 35 U.S.C. §120 from U.S. application Ser. No. 14/479,979 (now U.S. Pat. No. 9,323,478), filed Sep. 8, 2014, which is based on and claims the benefit of priority under 35 U.S.C. §119 from Japanese priority application No. 2013-189064, filed on Sep. 12, 2013, the entire contents of each of which is incorporated herein by reference.

BACKGROUND OF THE INVENTION

1. Field of the Invention

The disclosures discussed herein relate to a system, an apparatus, and an information processing method.

2. Description of the Related Art

Information processing terminals such as smartphones and tablet terminals allow users to install any application programs to expand their functions. In addition, such information processing terminals are capable of displaying rich graphical expressions via a graphic user interface (GUI) as well as exhibiting excellent operability via a touch panel.

One aspect of the embodiments is to improve an operability of an operating part of an apparatus via the GUI.

SUMMARY OF THE INVENTION

In one aspect of the embodiment, there is provided an apparatus that includes an operating unit. The operating unit includes one or more processors each configured to transmit an execution request for executing a process based on a user's operation; and delivery unit configured to receive event information indicating an event generated in the apparatus, and to deliver the received event information to the processors. A connection is established for performing communications between the apparatus and the operating unit every time each of the processors transmits the execution request, and a permanent connection for performing communications between the apparatus and the operating unit that is permanently established is used when the delivery unit receives the event information.

Other objects, features and advantages of the present invention will become more apparent from the following detailed description when read in conjunction with the accompanying drawings.

DETAILED DESCRIPTION OF THE PREFERRED EMBODIMENTS

Attempts have been made to develop information processing terminals such as smartphones and tablets to serve as an operating part of an apparatus such as an image forming apparatus. For example, attempts have been made to enable an application program (hereinafter simply called an "application") installed on the information processing terminal to control the apparatus.

There are some applications that operate concurrently with monitoring the apparatus. For example, a copy application may display current copy progress information (e.g., how many sheets have been printed) on the terminal's operations screen. To implement such a display, it may be necessary to rapidly detect a change of a status of the apparatus that differs from the information processing terminal on which such an application operates. It may be easy to detect events within the apparatus when the application operates on the apparatus. However, the information processing terminal exchanges information with the apparatus via communications. Thus, it may be difficult for the application operating on the information processing terminal to detect the change of the status of the apparatus.

Hence, one proposal may be to use polling for allowing the application operating on the information processing terminal to monitor the status of the apparatus.

However, when two or more applications concurrently perform polling, memory consumption of the information processing terminal or the apparatus may increase. This may make the information processing terminal or the apparatus unstable. Further, it may be difficult to detect the current status of the apparatus in some polling cycles. Thus, the actual status of the apparatus may largely deviate from the content displayed on the information processing terminal.

Figure 1:
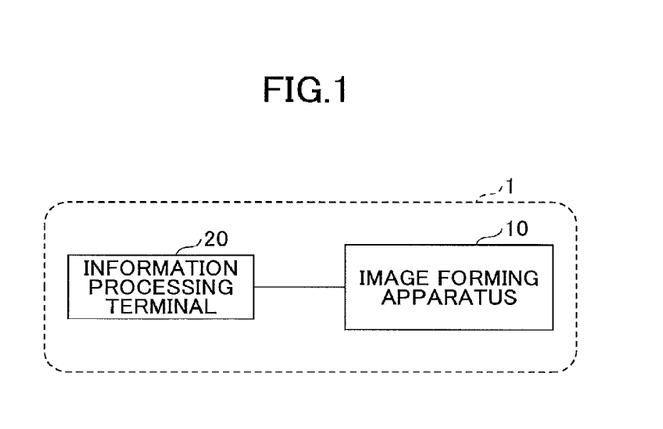
FIG. 1 is a diagram illustrating a configuration example of an information processing system according to an embodiment.

In the following, a description is given of embodiments with reference to accompanying drawings. FIG. 1 is a diagram illustrating a configuration example of an information processing system according to an embodiment. In an information processing system 1 illustrated in FIG. 1, an image forming apparatus 10 is connected to an information processing terminal 20 such that the image forming apparatus 10 communicates with the information processing terminal 20. The communications between the image forming apparatus 10 and the information processing terminal 10 may be performed, for example, via a universal serial bus (USB), close-range wireless communications such as Bluetooth (Registered Trademark) or infrared communications, or a local area network (LAN) (wired or wireless).

The image forming apparatus 10 is a multifunctional peripheral that incorporates the functionality of multiple devices such as a printer, a scanner, a copier and a facsimile machine, into one. However, an apparatus having the functionality of any one of the above devices may serve as the image forming apparatus 10. Further, the image forming apparatus 10 in the embodiment is merely an example of the apparatus. Various kinds of apparatuses including a projector, a teleconference system, or a digital still camera may be used instead of the image forming apparatus 10.

The information processing terminal may be an electronic apparatus such as a smartphone or a tablet terminal that is capable of performing information processing independently. In the present embodiment, the information processing terminal 20 serves as an operations panel (an operating part) of the image forming apparatus 10.

The information processing terminal 20 may, for example, be fixed to a predetermined position of the image forming apparatus 10. Hence, the information processing terminal 20 and the image forming apparatus 10 may be handled as one apparatus. Alternatively, the information processing terminal 20 may be removable (detachable) from the image forming apparatus 10.

Figure 2:
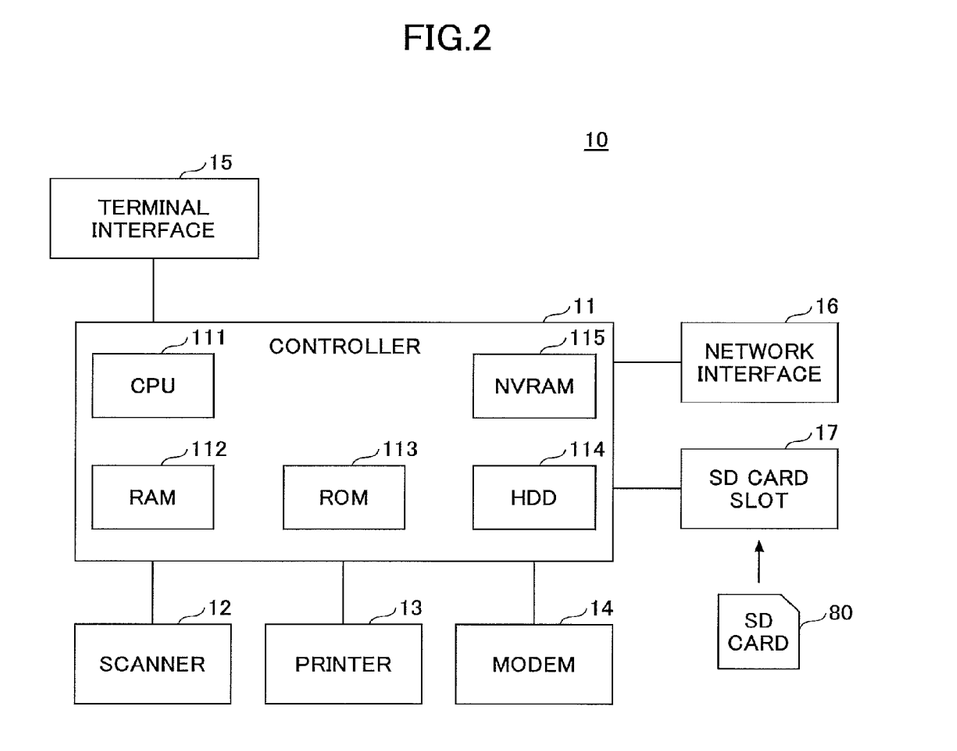
FIG. 2 is a diagram illustrating a hardware configuration example of an image forming apparatus according to an embodiment.

FIG. 2 is a diagram illustrating a hardware configuration example of an image forming apparatus according to an embodiment. In FIG. 2, the image forming apparatus 10 includes hardware such as a controller 11, a scanner 12, a printer 13, a modem 14, a terminal interface 15, a network interface 16, and an SD card slot 17.

The controller 11 includes a CPU 111, a RAM 112, a ROM 113, an HDD 114, and a NVRAM 115. The ROM 113 is configured to store various programs and data used by the programs. The RAM 112 serves as a storage area for loading the programs or as a working area for the loaded programs. The CPU 111 is configured to implement various functions by executing the programs loaded in the RAM 112. The HDD 114 is configured to store programs and various data used by the programs. The NVRAM 115 is configured to store various setting information and the like.

The scanner 12 is hardware for reading image data from a document (an image reading unit). The printer 13 is hardware for printing print data on a print sheet (a printing unit). The modem 14 is hardware for connecting the image forming apparatus 10 to a telephone line, and is used for transmitting or receiving image data via FAX communications. The terminal interface 15 is used for allowing the image forming apparatus 10 to communicate with the information processing terminal 20. For example, the terminal interface 15 may be a USB interface or hardware for close-range wireless communications. Alternatively, the terminal interface 15 may be hardware for connecting the image forming apparatus 10 to a network such as a LAN (wired or wireless). The network interface 16 is hardware for connecting the image forming apparatus 10 to a network such as a LAN (wired or wireless). The SD card slot 17 is used for reading programs stored in an SD card 80. That is, in the image forming apparatus 10, not only are the programs stored in the ROM 113 loaded but the programs stored in the SD card 80 are also loaded to be executed in the RAM 112. Note that the SD card 80 may be replaced with other recording media (e.g., a CD-ROM or a universal serial bus (USB) memory). That is, a type of the recording medium corresponding to the SD card 80 is not limited to a predetermined one. In this case, the SD card slot 17 may be replaced with hardware in compliance with the type of the recording medium.

Figure 3:
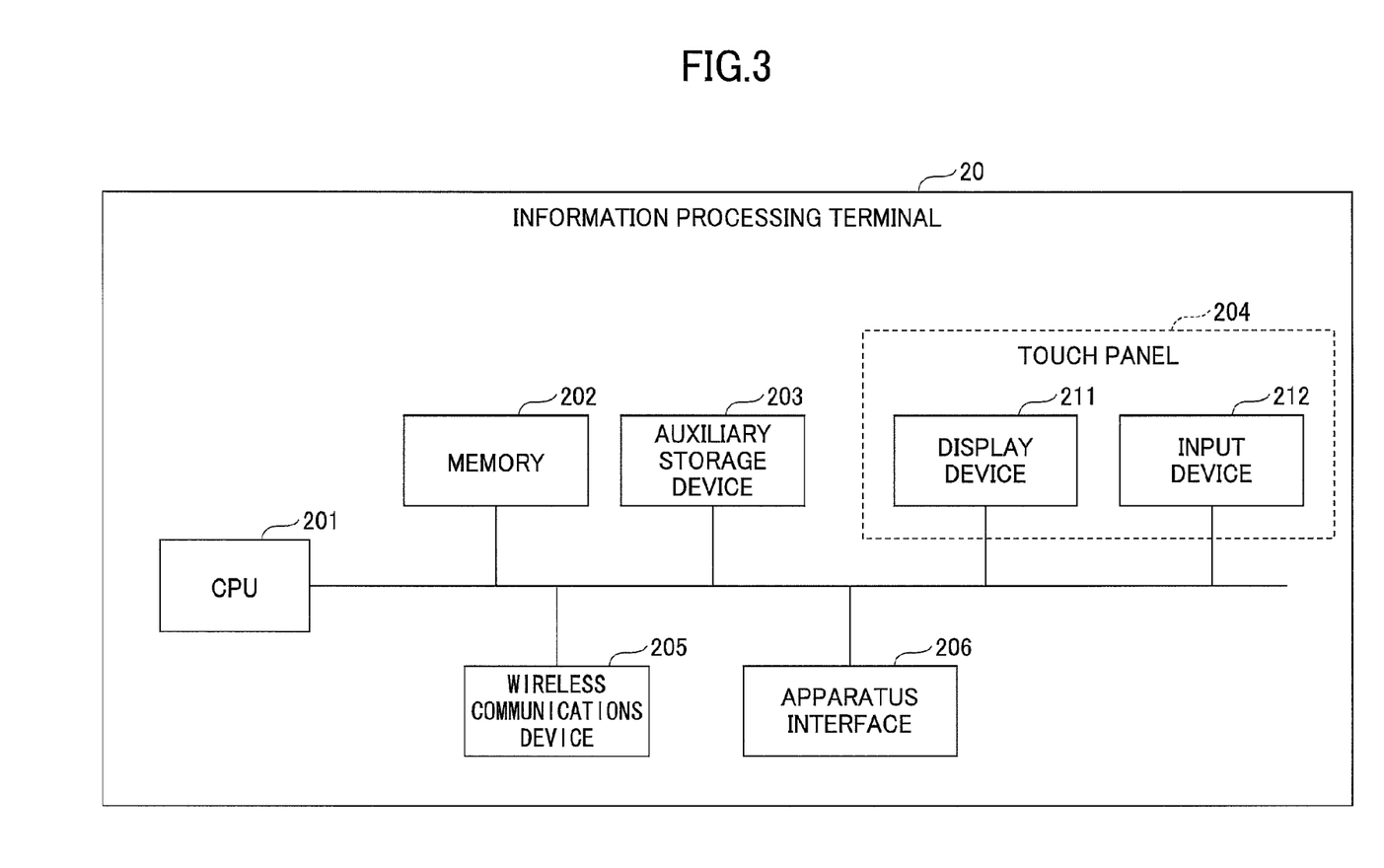
FIG. 3 is a diagram illustrating a hardware configuration example of an information processing terminal according to an embodiment.

FIG. 3 is a diagram illustrating a hardware configuration example of an information processing terminal according to an embodiment. In FIG. 3, the information processing terminal 20 includes a CPU 201, memory 202, an auxiliary storage device 203, a touch panel 204, a wireless communications device 205, and an apparatus interface 206.

The auxiliary storage device 203 is configured to store programs installed in the information processing terminal 20. The memory 202 is configured to retrieve the programs from the auxiliary storage device 203 and store the retrieved programs when receiving program activation instructions. The CPU 201 is configured to implement functions associated with the information processing terminal 20 based on the programs stored in the memory 202.

The touch panel 204 is an electronic component provided both with an input function and a display function, and is configured to display information, receive input from a user, and the like. The touch panel 204 includes a display device 211 and an input device 212.

The display device 211 is a liquid crystal display or the like, and configured to serve as a display function of the touch panel 204. The input device 212 is an electronic component including a sensor to detect contact of a contactant when the contactant touches the display device 211. The detecting method of the contact of the contactant may be any known method such as an electrostatic method, a resistive film method, or an optical method. Note that the contactant indicates an object that is in contact with (touches) a contact surface (a surface) of the touch panel 204. Examples of such contactant may be a user's finger, a dedicated pen or a general pen, and the like.

The wireless communications device 205 is an electronic component such as an antenna necessary for performing communications via a wireless local area network (LAN) or a mobile communications network. The terminal interface 206 is used for allowing the information processing terminal 20 to communicate with the image forming apparatus 10. That is, the apparatus interface 206 is configured to provide compatibility to the terminal interface 15 to allow the information processing terminal 20 to communicate with the image forming apparatus 10.

Figure 4:
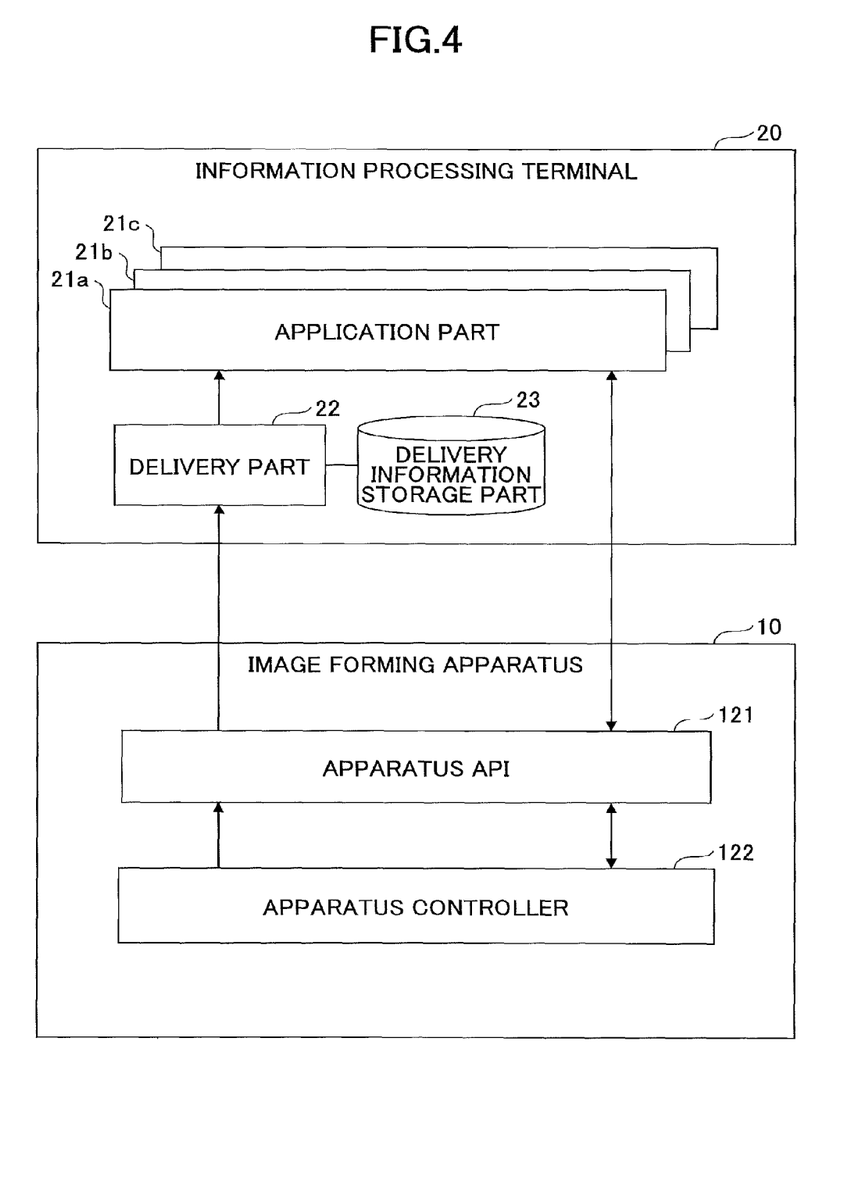
FIG. 4 is a diagram illustrating a functional configuration example of the information processing system according to the embodiment.

FIG. 4 is a diagram illustrating a functional configuration example of the information processing system according to the embodiment. In FIG. 4, the information processing terminal 20 includes at least one of application parts 21 (e.g., 21a to 21c), and a delivery part 22. The information processing terminal 20 further includes a delivery information storage part 23.

Each of the application parts 21 is configured to be implemented by one of the application programs installed in the information processing terminal 20 that causes a CPU 201 to execute a process. The application part 21 may, for example, display an operations screen on the display device 211, and execute a predetermined process based on an instruction that the user inputs via the operations screen. In the course of the predetermined process, the application part 21 may, for example, transmit an execution request for executing the predetermined process to the image forming apparatus 10 by utilizing an apparatus API 121 contained in the image forming apparatus 10. Note that the application programs may be installed in the information processing terminal 20 at any timing.

The delivery part 22 is configured to deliver information indicating generation of some kind of an event (hereinafter called an "event") in the image forming apparatus 10 to each of the application parts 21. That is, an event generated asynchronously with the predetermined request from the application part 21 is not reported in a response from the image forming apparatus 10 corresponding to the request from the application part 21. The delivery part 22 receives event information of such an event from the image forming apparatus 10, and delivers the received event information to each of the application parts 21. The delivery part 22 is implemented by a program installed in the information processing terminal 20 that causes a CPU 201 to execute a process. Note that an example of the event includes change in the status of the image forming apparatus 10. More specifically, the event may be various one of the events including paper jamming, out of toner, a change in the job status, transition to a power saving mode, reverting from the power saving mode, and the like.

The delivery information storage part 23 is configured to store information to specify one of the application parts 21 that serves as a delivery destination of the event information. The delivery information storage part 23 may, for example, be implemented by utilizing memory 202 or an auxiliary storage device 203.

On the other hand, the image forming apparatus 10 includes the apparatus API 121 and an apparatus controller 122. The apparatus API 121 is an application program interface (API) configured to receive requests from the application parts 21. In the present embodiment, the apparatus API 121 is implemented as a Web API. That is, the apparatus API 121 is implemented as an API by utilizing hypertext transfer protocol (HTTP) communications. In this case, a type or a content of the request are indicted by a uniform resource locator (URL) specified in an HTTP request. Note that the communications protocol for implementing the apparatus API 121 is not limited to the HTTP communications. For example, a simple object access protocol (SOAP) or other communication protocols may be used.

The apparatus controller 122 is configured to execute a process based on the request received by the apparatus API. Note that in FIG. 4, the apparatus controller 122 is illustrated as one clock. However, the apparatus controller 122 may be divided into different functions. Further, each of the divided apparatus controllers 122 may be implemented by an application program of the image forming apparatus 10 that causes a CPU 111 to execute a process.

Figure 5:
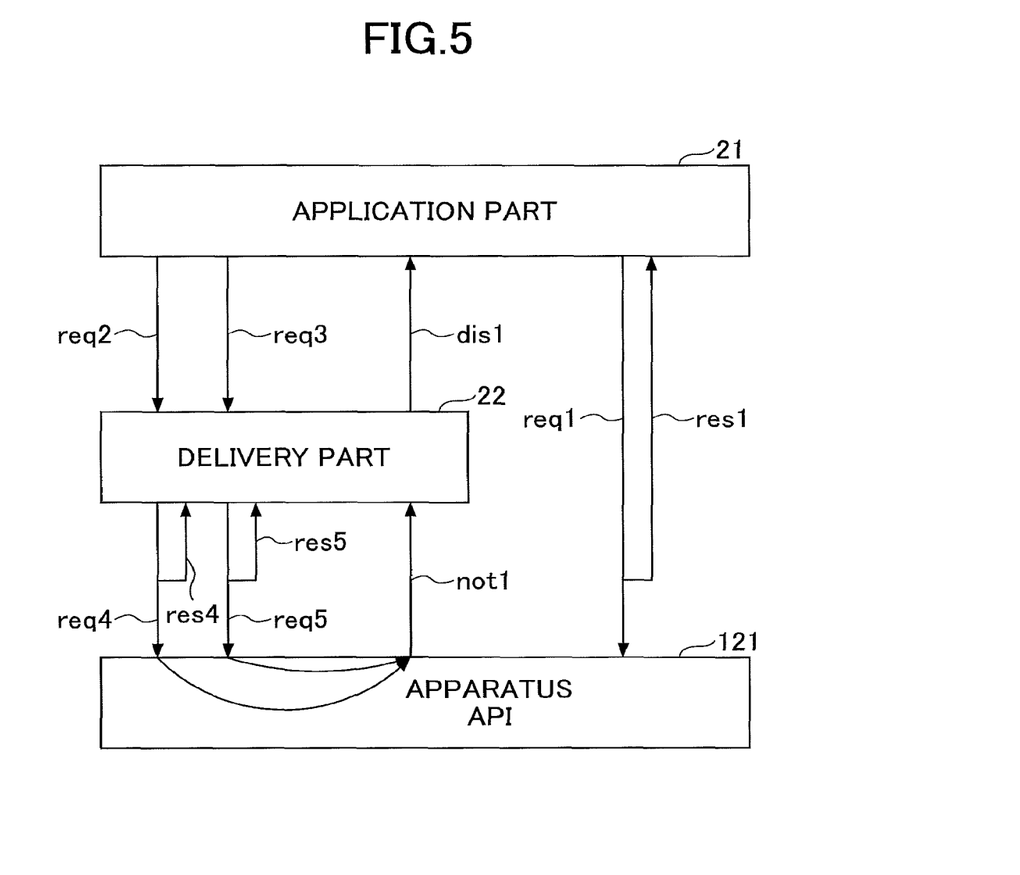
FIG. 5 is a diagram illustrating a mechanism of retrieving an apparatus API and delivering event information performed by the application part.

FIG. 5 is a diagram illustrating a mechanism in which an apparatus API is retrieved by the application part 21 and event information is delivered from the image forming apparatus 10.

A retrieving request req1 of the apparatus API 121 transmitted by the application part 21 is implemented as an HTTP request. A response res1 to the apparatus API 121 is implemented as an HTTP response. The HTTP communications are connected every time the apparatus API 121 is retrieved. For example, when a connection (a session) of the HTTP communications is established or issued (hereinafter generically referred to as "established") every time the apparatus API 121 is retrieved, and a response to a retrieving request is transmitted, the connection is cut off. When the connection is retained, memory consumption of both the information processing terminal 20 and the image forming apparatus 10 may be increased. A temporary or a sequential connection that is established or cut off every time the apparatus API 121 is retrieved is hereinafter called a "temporary session".

On the other hand, the delivery part 22 establishes a permanent connection of the HTTP communications (hereinafter called a "permanent session") for receiving, from the image forming apparatus 10, event information of an event generated in the image forming apparatus 10 asynchronously with the retrieval of the apparatus API 121 (a request from the application part 21). When the delivery part 22 receives delivery requests req2 and req3 for specific events in the image forming apparatus 10 from the respective application parts 21, the delivery part 22 transmits reporting requests req4 and req5 associated with the delivery requests req2 and req3 to the image forming apparatus 10 by retrieving the apparatus API 121. Note that in FIG. 5, the reporting request req4 corresponds to the delivery request req2, and the reporting request req5 corresponds to the delivery request req3.

Further, the reporting requests req4 and req5 are transmitted to the image forming apparatus 10 via a temporary session. The apparatus API 121 returns responses res4 and res5 in response to the reporting requests req4 and req5.

Subsequently, when events specified in the reporting request req4 or req5 are generated in the image forming apparatus 10, a report not1 of event information of the generated event is transmitted from the apparatus API 121 to the delivery part 22. Note that a permanent session may be used for transmitting the report not1 such that the report not1 is immediately transmitted in response to the generation of an event. The delivery part 22 transmits a delivery dis1 of the event information to the application part 21 that has transmitted the delivery request for delivering the event information of the event.

As described above, a temporary session is used to transmit a request from the application part 21 or the delivery part 22 to the apparatus API 121, and a permanent session that has been established between the delivery part 22 and the apparatus API 121 is continuously used to transmit a report of the event information from the apparatus API 121. Note that the permanent session may be implemented by utilizing, for example, chunked transfer in the HTTP or utilizing other mechanisms.

Figure 6:
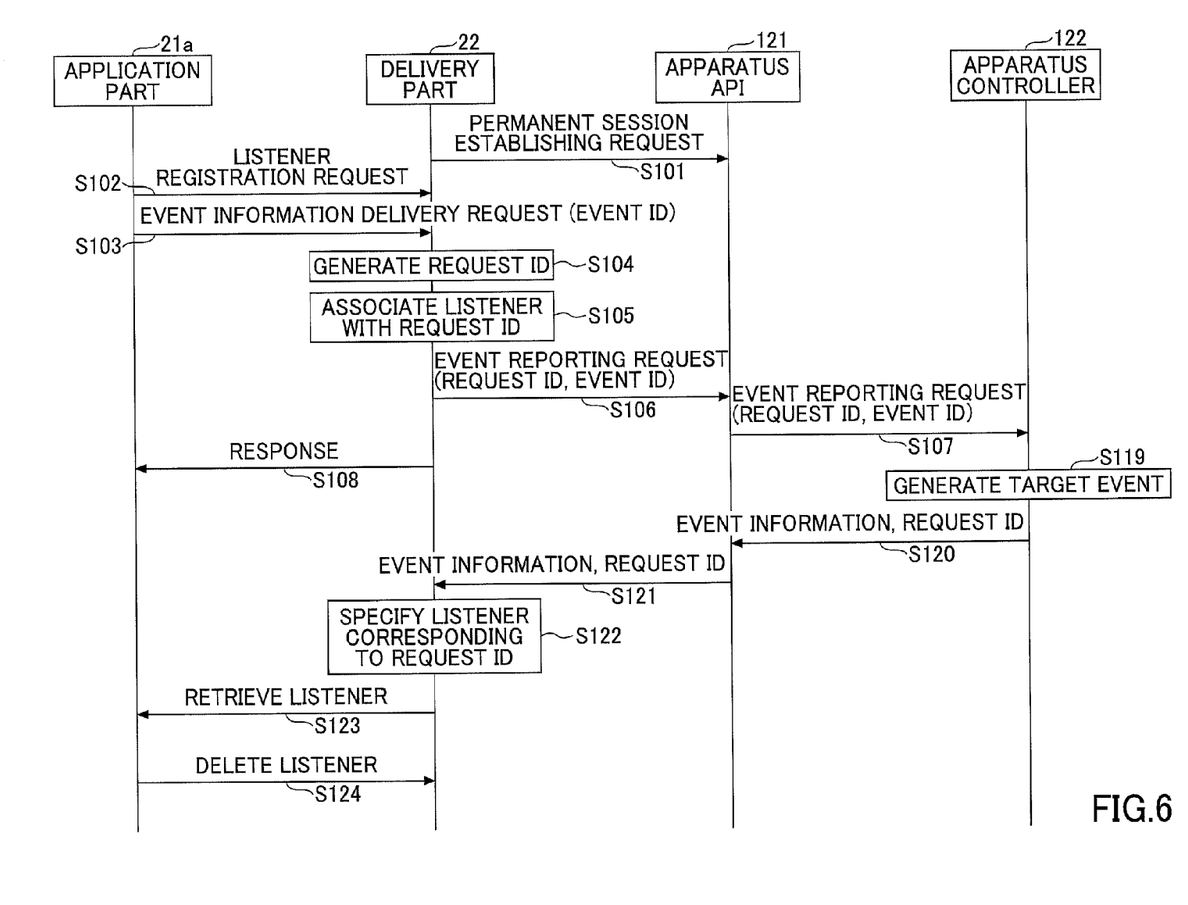
FIG. 6 is a sequence diagram illustrating an example of a process of delivering event information.

Next, an illustration is given below of a process executed by the information processing terminal 20 and the image forming apparatus 10. FIG. 6 is a sequence diagram illustrating an example of a process of delivering event information.

In step S101, the delivery part 22 retrieves the apparatus API 121 associated with a permanent session establishing request by transmitting the HTTP request indicating the permanent session establishing request to the image forming apparatus 10. As a result, a permanent session is established between the information processing terminal 20 and the image forming apparatus 10.

On the other hand, the application part 21a transmits a listener registration request for receiving the event information delivery to the delivery part 22 at any given time (step S102). The listener registration request includes a specified listener. The listener may, for example, be an address of a callback function or an address of a predetermined object. Subsequently, the application part 21a transmits an event information delivery request for delivering a specific event subject to monitoring (hereinafter also called a "monitoring event") to the delivery part 22 (step S103). This monitoring request includes a specified event ID of the monitoring event. The event ID indicates identifying information for each event type. Subsequently, the delivery part 22 generates the identifying information unique to the request (hereinafter simply called a "request ID") in step S103 (step S104). Subsequently, the delivery part 22 stores in the delivery information storage part 23 the listener specified in step S102 in association with the event ID specified in step S103 and the request ID generated in step S104 (step S105).

Figure 7:
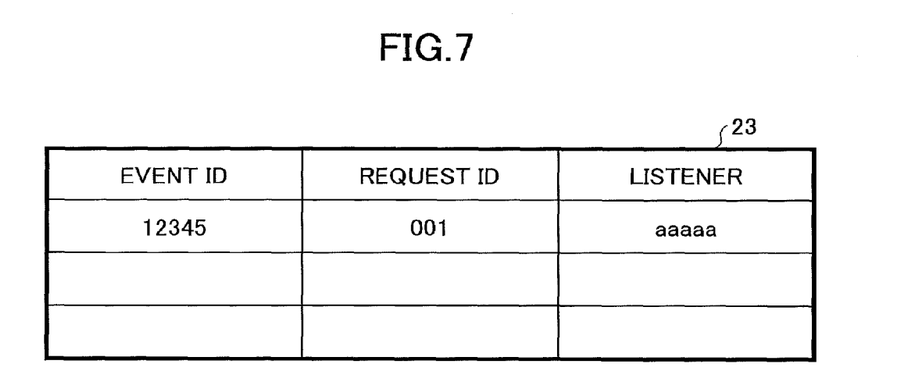
FIG. 7 is a diagram illustrating a configuration example of a delivery information storage part.

FIG. 7 is a diagram illustrating a configuration example of the delivery information storage part 23. As illustrated in FIG. 7, the delivery information storage part 23 stores the event ID and the request ID, and the listener in association with one another. Note that "aaaaa" in FIG. 7 is used as an example of a value indicating a listener for convenience of illustration.

Subsequently, the delivery part 22 retrieves the apparatus API 121 associated with the reporting event reporting request by specifying the request ID and the event ID and transmitting the HTTP request indicating a monitoring event reporting request (step S106). Subsequently, the apparatus API 121 transmits a monitoring event reporting request including the specified request ID and event ID to the apparatus controller 122 (step S107). The apparatus controller 122 stores the request ID in association with the event ID in, for example, RAM 112. Note that in step S106, the monitoring event reporting request is transmitted via a temporary session. Hence, though not illustrated in FIG. 6, the HTTP response to step S106 is returned to the delivery part 22 after step S107 is executed. The delivery part 22 transmits a response to the request in step S103 to the application part 21a (step S108). Hence, processes subsequent to step S119 are executed asynchronously with the processes before step S108.

Thereafter, when an event having an event ID "12345" is generated in the image forming apparatus 10 (step S119), the apparatus controller 122 reports event information of the event and the request ID associated with the event ID to the apparatus API 121, based on the event ID being stored in association with the request ID (step S120). The apparatus API 121 transmits the reported request ID and the event information to the delivery part 22 (step S121). Note that the request ID and the event information are transmitted in a form of the HTTP response via a permanent session. Further, the event information includes the event ID and other information associated with the event.

The delivery part 22 specifies a listener stored in the delivery information storage part 23 in association with the request ID that is received together with the event information in step S121 (step S122). Subsequently, the delivery part 22 retrieves the listener by specifying the event information (step S123). As a result, the event information is delivered to the application part 21a that has registered the listener. Thereafter, when the delivery of the event information of the monitoring event becomes unnecessary, the application part 21a transmits a deleting request for deleting the listener registered in step S102 to the delivery part 22 (step S124). The delivery part 22 deletes a record associated with the listener from the delivery information storage part 23. As a result, the event information of the monitoring event is not reported to the application part 21a after the deletion of the record associated with the listener.

Figure 8:
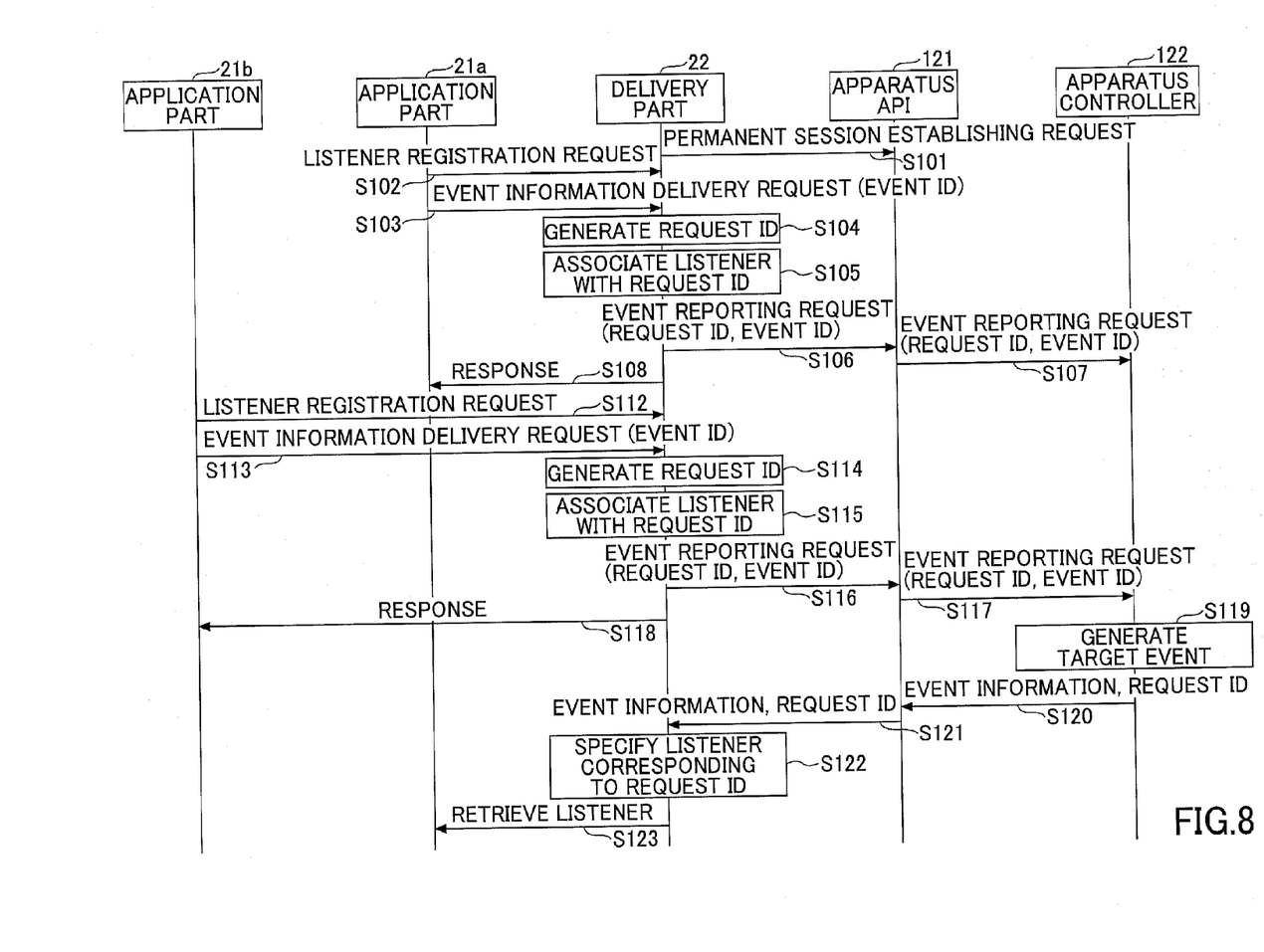
FIG. 8 is a sequence diagram illustrating an example of a process of delivering event information when two or more application parts transmit delivery requests for delivering mutually different event information.

Subsequently, an illustration is given of a case where delivery requests for delivering event information (event information delivery requests) are transmitted from two or more application parts 21. FIG. 8 is a sequence diagram illustrating an example of a process of delivering event information when two or more application parts transmit delivery requests for delivering mutually different event information (mutually different event information delivery requests). In FIG. 8, steps identical to those in FIG. 6 are provided with the same reference numbers, and duplicated descriptions are appropriately omitted from the specification.

In FIG. 8, an application part 21b transmits to the delivery part 22 a listener registration request together with an event information delivery request, after step S108 or after step S105 at the earliest (steps S112 and S113). Note that the event ID specified by the application part 21b in step S113 differs from the event ID of the monitoring event for the application part 21a. That is, the monitoring event for the application part 21a differs from the monitoring event for the application part 21b in the example of FIG. 8.

Hence, in steps S114 to S118, processes corresponding to those of steps S104 to S108 are executed in response to the event information delivery request from the application part 21b.

Figure 9:
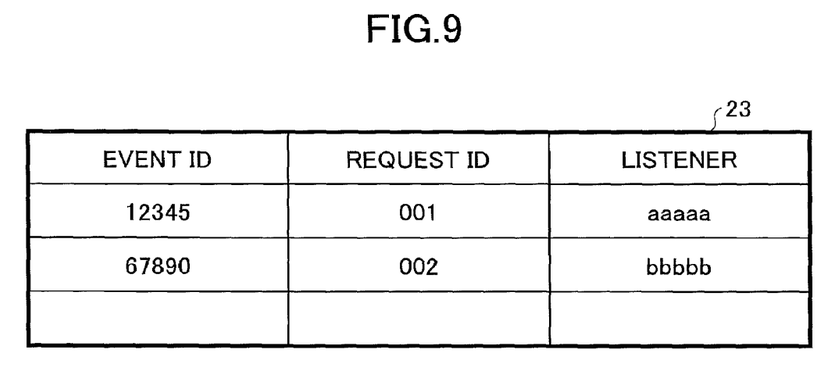
FIG. 9 is a diagram illustrating an example of a stored content of the delivery information storage part 23 when two or more application parts transmit delivery requests for delivering mutually different event information.

For example, in step S115, an example of a stored content of the delivery information storage part 23 may be illustrated in FIG. 9.

FIG. 9 is a diagram illustrating an example of a stored content of the delivery information storage part 23 when two or more application parts transmit delivery requests for delivering mutually different event information.

In FIG. 9, the second record indicates a record registered in response to the event information delivery request from the application part 21b. That is, FIG. 9 illustrates an example of the event ID of the monitoring event of the application part 21b being "67890", the listener registered from the application part 21b being "bbbbb". Further, in this example, the request ID "002" is assigned to the event information delivery request from the application part 21b.

Thereafter, when the event having the event ID "12345" is generated in the image forming apparatus 10 (step S119), steps S120 to S123 are executed. That is, the listener stored in the delivery information storage part 23 in association with the event ID "12345" is "aaaaa" registered from the application part 21a alone. Hence, the event information associated with this event ID ("12345") is reported to the application part 21a alone. In a case where an event having the event ID "67890" is generated in the image forming apparatus 10, the event information associated with this event ID ("67890") is reported to the application part 21b.

As described above, different request IDs that are assigned to the different event information delivery requests transmitted from the respective application parts 21 are managed by the delivery part 22. Further, the delivery part 22 receives the request ID together with the event information from the image forming apparatus 10. Hence, the delivery part 22 may be able to deliver to a corresponding one of the application parts 21 an appropriate one of event information of the events which the corresponding application part 21 detects as being subject to monitoring. That is, the delivery part 22 may be able to avoid delivering event information unnecessary for each of the application parts 21. As a result of avoiding unnecessary event information delivery for each of the application parts 21, it may be possible to reduce load required for unnecessary event information delivery processes as well as improving real-time performance for reporting event information to each of the application parts 21.

Figure 10:
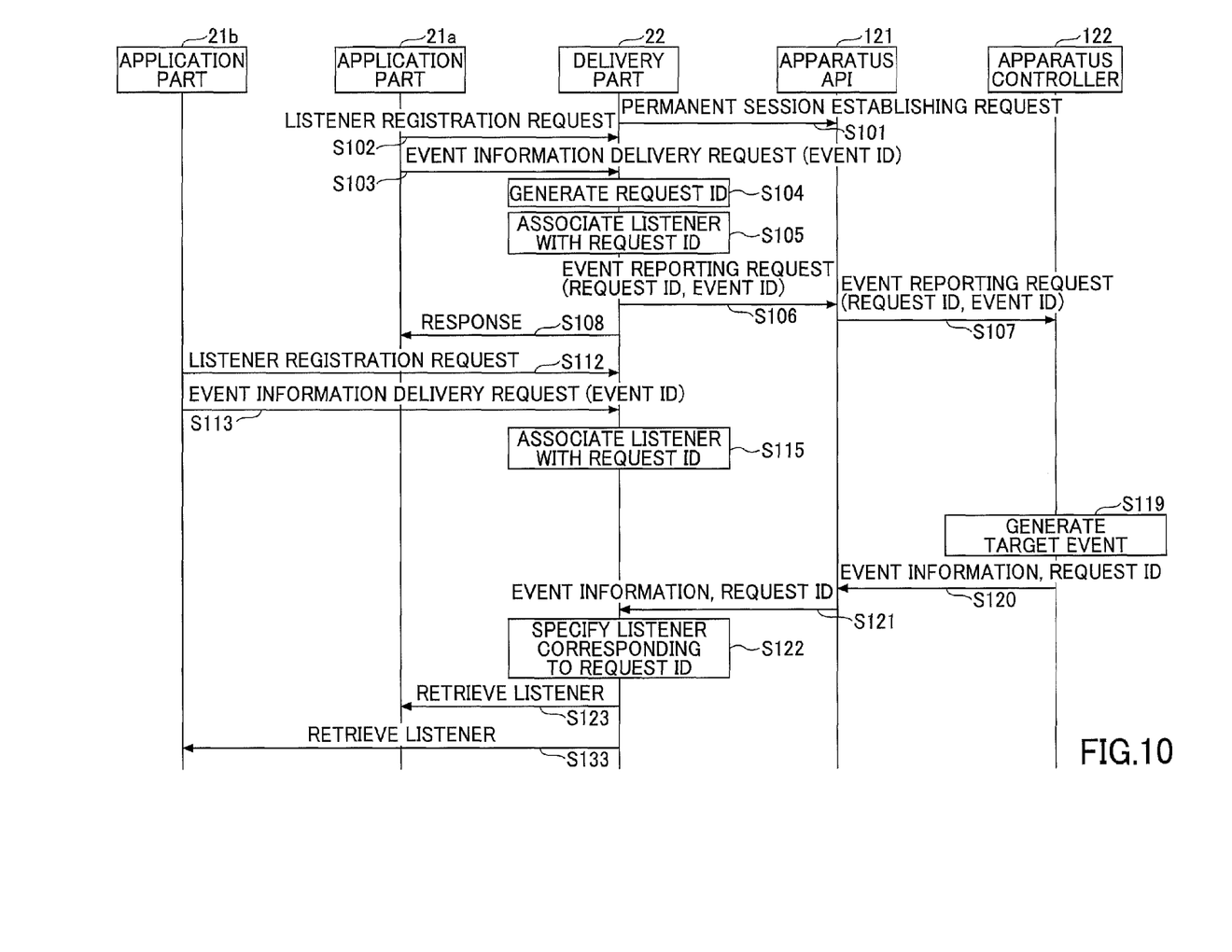
FIG. 10 is a sequence diagram illustrating an example of a process of delivering event information when two or more application parts transmit delivery requests for delivering identical event information.

Next, an illustration is given of a case where the two or more application parts 21 request delivery of identical event information. FIG. 10 is a sequence diagram illustrating an example of a process of delivering event information when two or more application parts transmit delivery requests for delivering identical event information (identical event information delivery requests). In FIG. 10, steps identical to those in FIG. 6 or FIG. 8 are provided with the same reference numbers, and duplicated descriptions are appropriately omitted from the specification.

In FIG. 10, the application part 21b transmits to the delivery part 22 a listener registration request together with an event information delivery request, after step S108 or after step S105 at the earliest (steps S112 and S113). Note that the event ID specified by the application part 21b in step S113 is the same as the event ID of the monitoring event for the application part 21a. That is, the monitoring event for the application part 21a is common with the monitoring event for the application part 21b in the example of FIG. 10.

Hence, the delivery part 22 stores in the delivery information storage part 23 the listener registered from the application part 21b in association with the request ID generated with respect to the event information delivery request for delivering the monitoring event from the application part 21a (step S115).

Figure 11:
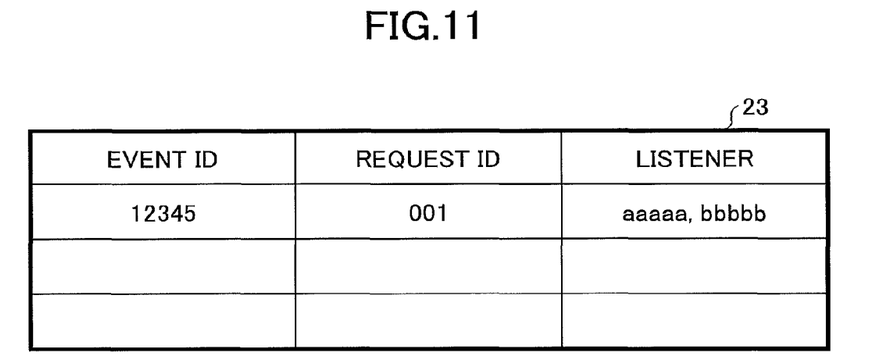
FIG. 11 is a diagram illustrating an example of a stored content of the delivery information storage part when two or more application parts transmit delivery requests for delivering identical event information.

FIG. 11 is a diagram illustrating an example of a stored content of the delivery information storage part 23 when two or more application parts transmit delivery requests for delivering identical event information. In FIG. 11, "bbbbb" represents a listener registered from the application part 21b. As illustrated in FIG. 11, the listener ("aaaaa") registered from the application part 21a and the listener ("bbbbb") registered from the application part 21 are both listeners of an event associated with the identical event ID. Hence, the listener ("aaaaa") and the listener ("bbbbb") are stored in the delivery information storage part 23 both in association with the identical request ID. Hence, another request ID is not newly generated for the event information delivery request from the application part 21b. In this case, when a listener deleting request is received from one of the application parts 21a and 21b, a corresponding one of the listeners of the application parts 21 associated with the request is deleted from a record. This record is deleted when all the listeners registered in the record are deleted. Note that the record associated with the "bbbbb" may differ from the record associated with the "aaaaa". In this case, the event ID and the request ID of the record associated with the "bbbbb" have the same values as those of the record associated with the "aaaaa".

Further, processes corresponding not only to step S104 but also to steps S106 and S107 are not executed in response to the event information delivery request from the application part 21b. The processes corresponding to steps S104, S106, and S107 will not be executed because the monitoring event reporting request has already reported to the apparatus controller 122. However, processes similar to those of steps S106 and S107 may be executed in response to the event information delivery request from the application part 21b by specifying the identical request ID and event ID.

Thereafter, when the monitoring event is generated in the image forming apparatus 10 (step S119), steps S120 to S122 are executed. In step S122, "aaaaa" and "bbbbb" are specified as the listeners stored in the delivery information storage part 23 in association with the request ID received together with the event information in step S121. Hence, the delivery part 22 retrieves those two listeners by specifying the identical event information. As a result, the event information is reported to each of the application parts 21a and 21b (steps S123 and 133).

As described above, the delivery requests for delivering the identical event information transmitted from the two or more application parts 21 are transmitted to the image forming apparatus 10 as one request (one event reporting request). Hence, it may be possible to prevent processes of steps S120 to S122 corresponding to one event generated in the image forming apparatus 10 from being executed two or more times. As a result, real-time performance for reporting the event information to each of the application parts 21 may be improved.

As described above, according to the embodiment, a permanent session is used for transmitting the event information report from the image forming apparatus 10 to the information processing terminal 20. Hence, the image forming apparatus 10 may be able to report the event information with high real-time performance. Hence, according to the embodiment, it may be possible to improve the operability of the operating part of the image forming apparatus 10.

Further, the permanent session is continuously used for two or more events and is also shared with two or more application parts 21. Hence, it may be possible to prevent memory consumption from increasing due to an increase in the number of permanent sessions.

Further, the application part 21 uses a temporary session to retrieve the apparatus API 121. Hence, memory consumption may be prevented from increasing owing to the use of the temporary session.

Note that in the above embodiment, the image forming apparatus 10 is an example of an apparatus. The application part 21 is an example of a processor. The event information is an example of event information. The listener is an example of first identifying information. The event ID is an example of second identifying information. The delivering information storage part 23 is an example of a storage part.

According to the above-described embodiment, it may be possible to improve operability of the operating part of the apparatus.

The embodiments of the present invention are described above. However, the present invention is not limited to the specifically disclosed embodiments, and variations and modifications may be made without departing from the scope of the present invention.

What is claimed is:
1. An apparatus comprising:
an operating unit, wherein
the operating unit includes one or more processors each configured to transmit an execution request for executing a process based on a user's operation;
a delivery unit configured to receive event information indicating an event generated in the apparatus, and to deliver the received event information to the one or more processors,
wherein when the delivery unit receives a delivery request for delivering event information from each of the one or more processors, each of the event information including first identifying information for a corresponding one of the one or more processors and second identifying information for a corresponding one of the event information, the delivery unit stores each of the first identifying information in association with a corresponding one of the second identifying information in a storage unit, and transmits a reporting request for reporting the event information associated with the corresponding one of the second identifying information, and
wherein when the delivery unit receives event information from the apparatus, the delivery unit delivers the received event information to the processor associated with the first identifying information stored in the storage unit in association with the second identifying information associated with the received event information.

2. The apparatus as claimed in claim 1, wherein
a temporary connection is established for performing communications between the apparatus and the operating unit every time each of the one or more processors transmits the execution request, and
a continuously used connection for performing communications between the apparatus and the operating unit that is continuously established is used when the delivery unit receives the event information.

3. The apparatus as claimed in claim 2, wherein
when the delivery unit receives the delivery request for delivering event information from each of the one or more processors, each of the event information including first identifying information for a corresponding one of the one or more processors and second identifying information for a corresponding one of the event information, the delivery unit stores each of the first identifying information in association with a corresponding one of the second identifying information in the storage unit, for each of the one or more processors, and transmits the reporting request for reporting the event information associated with the corresponding one of the second identifying information included in the delivery request from the corresponding one of the one or more processors, for each of the one or more processors.

4. The apparatus as claimed in claim 2, wherein
when the delivery unit receives the delivery request for delivering event information from each of the one or more processors, each of the event information including first identifying information for a corresponding one of the one or more processors and the second identifying information identical to the first information, the delivery unit stores each of the first identifying information in association with the second identifying information in the storage unit, and transmits the reporting request of the event information associated with the corresponding one of the second to the apparatus, and wherein
when the delivery unit receives the event information from the apparatus, the delivery unit delivers the received event information to each of the one or more processors associated with the first identifying information stored in the storage unit in association with the second identifying information associated with the received event information.

5. The apparatus as claimed in claim 4, wherein
the delivery unit transmits one reporting request to the apparatus in response to delivery requests from the one or more processors.

6. A system comprising:
an apparatus; and
an information processing terminal serving as an operating unit of the apparatus, wherein
the information processing terminal includes
one or more processors each configured to transmit an execution request for executing a process based on a user's operation;
a delivery unit configured to receive event information indicating an event generated in the apparatus, and to deliver the received event information to the one or more processors,
wherein when the delivery unit receives a delivery request for delivering event information from each of the one or more processors, each of the event information including first identifying information for a corresponding one of the one or more processors and second identifying information for a corresponding one of the event information, the delivery unit stores each of the first identifying information in association with a corresponding one of the second identifying information in a storage unit, and transmits a reporting request for reporting the event information associated with the corresponding one of the second identifying information, and
wherein when the delivery unit receives event information from the apparatus, the delivery unit delivers the received event information to the processor associated with the first identifying information stored in the storage unit in association with the second identifying information associated with the received event information.

7. The system as claimed in claim 6, wherein
a temporary connection is established for performing communications between the apparatus and the operating unit every time each of the one or more processors transmits the execution request, and
a continuously used connection for performing communications between the apparatus and the operating unit that is continuously established is used when the delivery unit receives the event information.

8. The system as claimed in claim 7, wherein
when the delivery unit receives the delivery request for delivering event information from each of the one or more processors, each of the event information including first identifying information for a corresponding one of the one or more processors and second identifying information for a corresponding one of the event information, the delivery unit stores each of the first identifying information in association with a corresponding one of the second identifying information in the storage unit, for each of the one or more processors, and transmits the reporting request for reporting the event information associated with the corresponding one of the second identifying information included in the delivery request from the corresponding one of the one or more processors, for each of the one or more processors.

9. The system as claimed in claim 7, wherein
when the delivery unit receives the delivery request for delivering event information from each of the one or more processors, each of the event information including first identifying information for a corresponding one of the one or more processors and the second identifying information identical to the first information, the delivery unit stores each of the first identifying information in association with the second identifying information in the storage unit, and transmits the reporting request of the event information associated with the corresponding one of the second to the apparatus, and wherein
when the delivery unit receives the event information from the apparatus, the delivery unit delivers the received event information to each of the one or more processors associated with the first identifying information stored in the storage unit in association with the second identifying information associated with the received event information.

10. The system as claimed in claim 9, wherein
the delivery unit transmits one reporting request to the apparatus in response to delivery requests from the one or more processors.

11. A method for processing information performed by an operating unit of an apparatus, the method comprising:
causing one or more processors included in the operating unit to transmit an execution request for executing a process based on a user's operation to the apparatus;
causing a delivery unit included in the operating unit to receive event information indicating an event generated in the apparatus, and to deliver the received event information to the one or more processors, wherein
wherein when the delivery unit receives a delivery request for delivering event information from each of the one or more processors, each of the event information including first identifying information for a corresponding one of the one or more processors and second identifying information for a corresponding one of the event information, the delivery unit stores each of the first identifying information in association with a corresponding one of the second identifying information in a storage unit, and transmits a reporting request for reporting the event information associated with the corresponding one of the second identifying information, and
wherein when the delivery unit receives event information from the apparatus, the delivery unit delivers the received event information to the processor associated with the first identifying information stored in the storage unit in association with the second identifying information associated with the received event information.

12. The method as claimed in claim 11, wherein
a temporary connection is established for performing communications between the apparatus and the operating unit every time each of the one or more processors transmits the execution request, and
a continuously used connection for performing communications between the apparatus and the operating unit that is continuously established is used when the delivery unit receives the event information.

13. The method as claimed in claim 12, wherein
when the delivery unit receives the delivery request for delivering event information from each of the one or more processors, each of the event information including first identifying information for a corresponding one of the one or more processors and second identifying information for a corresponding one of the event information, the delivery unit stores each of the first identifying information in association with a corresponding one of the second identifying information in the storage unit, for each of the one or more processors, and transmits the reporting request for reporting the event information associated with the corresponding one of the second identifying information included in the delivery request from the corresponding one of the one or more processors, for each of the one or more processors.

14. The method as claimed in claim 12, wherein
when the delivery unit receives the delivery request for delivering event information from each of the one or more processors, each of the event information including first identifying information for a corresponding one of the one or more processors and the second identifying information identical to the first information, the delivery unit stores each of the first identifying information in association with the second identifying information in the storage unit, and transmits the reporting request of the event information associated with the corresponding one of the second to the apparatus, and wherein
when the delivery unit receives the event information from the apparatus, the delivery unit delivers the received event information to each of the one or more processors associated with the first identifying information stored in the storage unit in association with the second identifying information associated with the received event information.

15. The method as claimed in claim 14, wherein
the delivery unit transmits one reporting request to the apparatus in response to delivery requests from the one or more processors.

16. An apparatus comprising:
processing circuitry configured to
implement one or more applications each configured to transmit an execution request for executing a process based on a user's operation;
implement a delivery unit configured to receive event information indicating an event generated in the apparatus, and to deliver the received event information to the one or more applications,
wherein when the delivery unit receives a delivery request for delivering event information from each of the one or more applications, each of the event information including first identifying information for a corresponding one of the one or more applications and second identifying information for a corresponding one of the event information, the delivery unit stores each of the first identifying information in association with a corresponding one of the second identifying information in a memory, and transmits a reporting request for reporting the event information associated with the corresponding one of the second identifying information, and
wherein when the delivery unit receives event information from the apparatus, the delivery unit delivers the received event information to the application associated with the first identifying information stored in the memory in association with the second identifying information associated with the received event information.

* * * * *